US007920871B2

(12) United States Patent
Okuda

(10) Patent No.: US 7,920,871 B2
(45) Date of Patent: Apr. 5, 2011

(54) TELEPHONE DEVICE

(75) Inventor: Shizue Okuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 366 days.

(21) Appl. No.: 10/242,513

(22) Filed: Sep. 12, 2002

(65) Prior Publication Data

US 2003/0078054 A1 Apr. 24, 2003

(30) Foreign Application Priority Data

Sep. 14, 2001 (JP) .................................. 2001-280347

(51) Int. Cl.
*H04W 24/00* (2009.01)

(52) U.S. Cl. ................ 455/456.1; 455/404.2; 455/456.6; 455/41.2

(58) Field of Classification Search .... 455/404.1–404.2, 455/41.2, 41.3, 403, 414.1, 414.2, 422.1, 455/456.1–457, 517, 566, 550.1, 552.1, 553.1, 455/556.1, 556.2, 41.1, 73, 74
See application file for complete search history.

(56) References Cited

U.S. PATENT DOCUMENTS

| 5,479,482 | A | * | 12/1995 | Grimes ....................... 455/556.1 |
| 5,982,324 | A | * | 11/1999 | Watters et al. ............ 342/357.06 |
| 6,140,959 | A | * | 10/2000 | Gudat et al. ............. 342/357.12 |
| 6,226,510 | B1 | * | 5/2001 | Boling et al. ............. 455/404.2 |
| 6,366,856 | B1 | * | 4/2002 | Johnson ........................ 701/213 |
| 6,448,927 | B1 | * | 9/2002 | Ishigaki et al. .......... 342/357.06 |
| 6,603,977 | B1 | * | 8/2003 | Walsh et al. ............... 455/456.1 |
| 6,684,078 | B1 | * | 1/2004 | Park .......................... 342/357.09 |
| 6,718,176 | B2 | * | 4/2004 | Michaud et al. .............. 455/457 |
| 6,741,864 | B2 | * | 5/2004 | Wilcock et al. ............ 455/456.1 |
| 6,751,546 | B2 | * | 6/2004 | Yamashita .................... 701/200 |
| 6,754,468 | B1 | * | 6/2004 | Sieben et al. ................ 455/41.2 |
| 6,925,288 | B2 | * | 8/2005 | McDonnell et al. ......... 455/41.2 |
| 6,928,230 | B2 | * | 8/2005 | Squibbs .......................... 386/46 |
| 7,034,705 | B2 | * | 4/2006 | Yoshioka ................... 340/636.1 |
| 7,085,578 | B2 | * | 8/2006 | Barclay et al. ................ 455/457 |
| 7,299,007 | B2 | * | 11/2007 | Eskin .......................... 455/41.2 |
| 7,324,823 | B1 | * | 1/2008 | Rosen et al. ............... 455/456.1 |
| 2001/0014597 | A1 | * | 8/2001 | Takiguchi et al. ............ 455/343 |
| 2002/0002036 | A1 | * | 1/2002 | Uehara et al. ................... 455/41 |
| 2002/0102989 | A1 | * | 8/2002 | Calvert et al. ................ 455/456 |
| 2002/0115453 | A1 | * | 8/2002 | Poulin et al. ................. 455/456 |

(Continued)

FOREIGN PATENT DOCUMENTS

JP           10-322752           12/1998

(Continued)

*Primary Examiner* — Anthony S Addy

(74) *Attorney, Agent, or Firm* — Finnegan, Henderson, Farabow, Garrett & Dunner, L.L.P.

(57) ABSTRACT

A telephone device which enables a user to consciously send a determined present position to a device in the surrounding area is provided. A portable telephone device 10 sends position determination information acquired by a GPS unit including a GPS antenna 31 and/or a portable telephone signal position determination processing unit including a portable telephone communication antenna 21, to another portable telephone device 50 as a desired communicating party via a base station by using a data communication function in accordance with a decision operation of a POS button 17*a*. Another portable telephone device 50 displays a map image of the vicinity of the received position determination information on an LCD display unit 52 by using an embedded digital map display application or the like, and also displays a present position point 53 of the portable telephone device 10 on the map image.

16 Claims, 18 Drawing Sheets

U.S. PATENT DOCUMENTS

| | | | |
|---|---|---|---|
| 2002/0143769 A1* | 10/2002 | Tecu et al. | 707/10 |
| 2003/0008662 A1* | 1/2003 | Stern et al. | 455/456 |
| 2003/0054830 A1* | 3/2003 | Williams et al. | 455/456 |
| 2003/0060211 A1* | 3/2003 | Chern et al. | 455/456 |
| 2003/0087628 A1* | 5/2003 | Michibata | 455/404 |
| 2004/0090349 A1* | 5/2004 | Iwata | 340/995.1 |
| 2007/0004379 A1* | 1/2007 | Stanners | 455/404.2 |

FOREIGN PATENT DOCUMENTS

| | | |
|---|---|---|
| JP | 2001-045549 | 2/2001 |

* cited by examiner

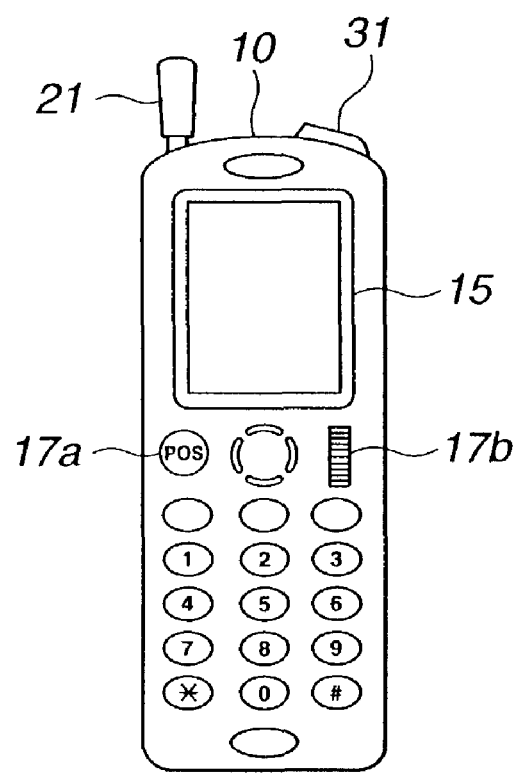
FIG.14A
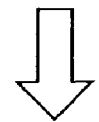
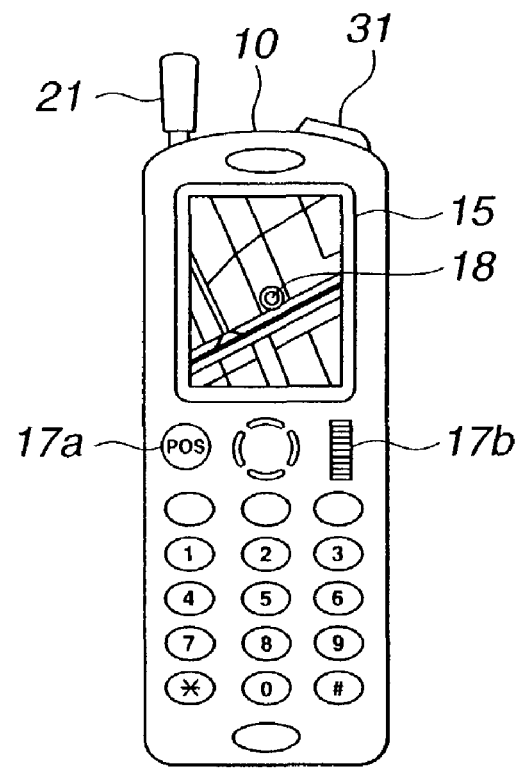
FIG.14B

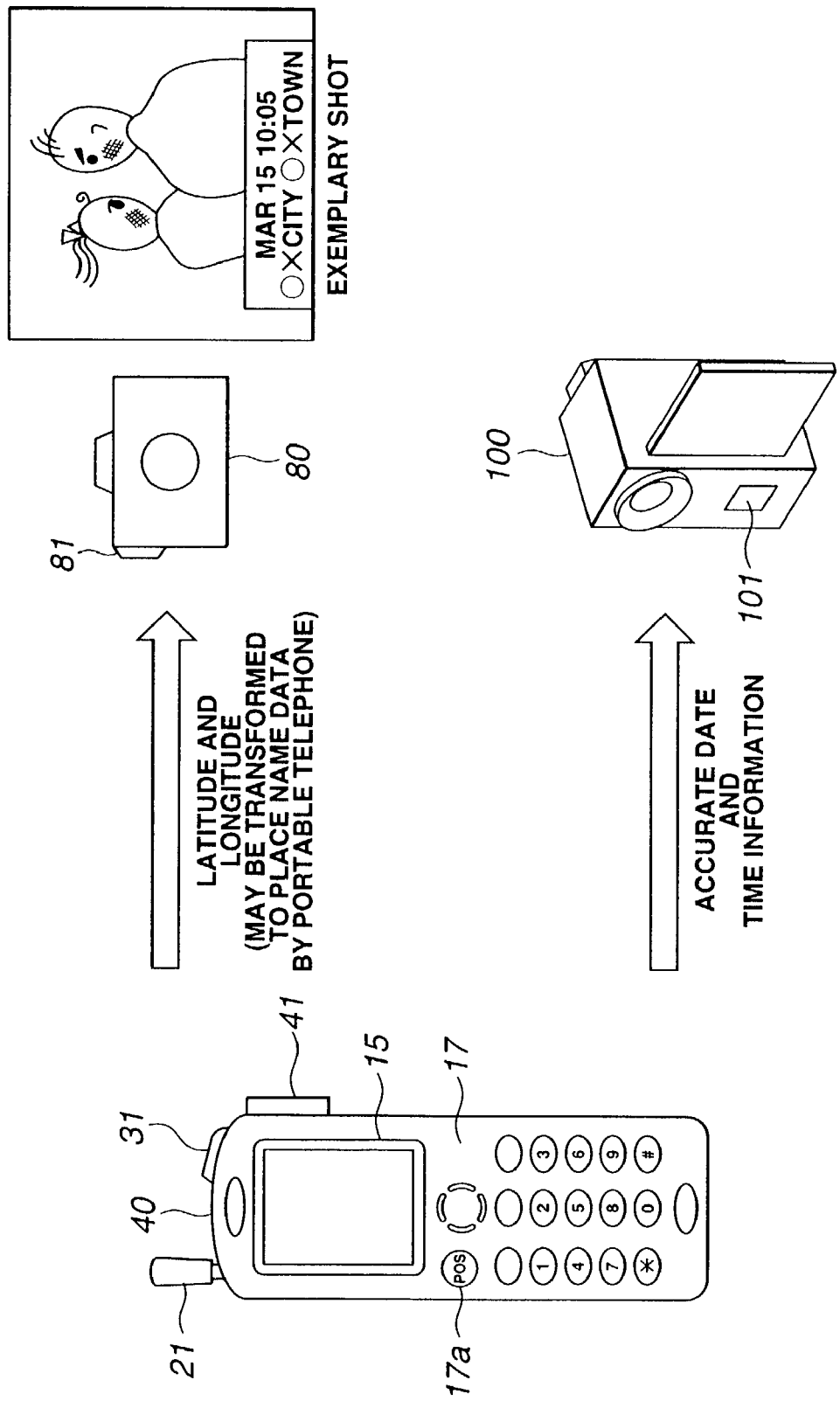

TELEPHONE DEVICE

BACKGROUND OF THE INVENTION

1. Field of the Invention

This invention relates to a telephone device having a function to transmit position determination information obtained by determining the present position, to a device existing in the surrounding area.

2. Description of the Related Art

Devices which calculate and apply the present position by using the Global Positioning System (GPS) or by using a technique for determining the present position in accordance with a base station signal of a portable telephone or the like have already been made commercially available.

In the position determination technique based on the GPS, using a C/A (coarse/acquisition) code included in L1 radio waves with a carrier frequency of 1575.42 MHZ sent from three or more of 24 satellites orbiting at an altitude of approximately 20,000 km, the distance between a mobile unit and the satellites is found, thus calculating the position of the mobile unit.

In the technique for calculating the present position by receiving a signal of a portable telephone base station, the distance between the base station and a mobile unit is calculated from the phase difference of radio waves and the present position is calculated by using triangular survey on the basis of this distance, as disclosed in the Japanese Patent Application No. 2001-45549 and the Japanese Publication of Unexamined Patent Application No. H10-322752.

Meanwhile, many of the commercially available devices are equipped with an internal unit capable of measuring the present position, but these devices do not enable users to consciously send the present position to devices in the surrounding area.

SUMMARY OF THE INVENTION

In view of the foregoing status of the art, it is an object of the present invention to provide a telephone device which enables a user to consciously send the determined present position to a device in the surrounding area.

According to the present invention, there is provided a telephone device for sending and receiving at least an audio signal to and from a desired communicating party via a base station, the telephone device comprising: present position determination means for determining a present position and thus acquiring position determination information; position determination information sending means for sending the position determination information acquired by the present position determination means; user interface means for allowing a user to decide transmission of the position determination information using at least the position determination information sending means; and control means for controlling at least the position determination information sending means on the basis of the decision by the user interface means.

According to the present invention, there is also provided a telephone device capable of sending and receiving at least an audio signal to and from a desired communicating party via a base station, and connecting to a network and transmitting a text, audio and/or video information to and from an information provider side and/or another terminal device, the telephone device comprising: present position determination means for determining a present position and thus acquiring position determination information; user interface means for allowing a user to decide determination of the present position using at least the present position determination means; and control means for controlling at least the present position determination means on the basis of the decision by the user interface means.

BRIEF DESCRIPTION OF THE DRAWINGS

FIGS. 14A and 14B show the use of the portable telephone device according to the present invention as a navigation device.

FIG. 16 is a view for explaining an example of use for sending present position data or the like to a digital camera or a portable VTR in the surrounding area by using the local radio communication unit of the portable telephone device.

DESCRIPTION OF THE PREFERRED EMBODIMENTS

Preferred embodiments of the present invention will now be described with reference to the drawings.

Figure 1:
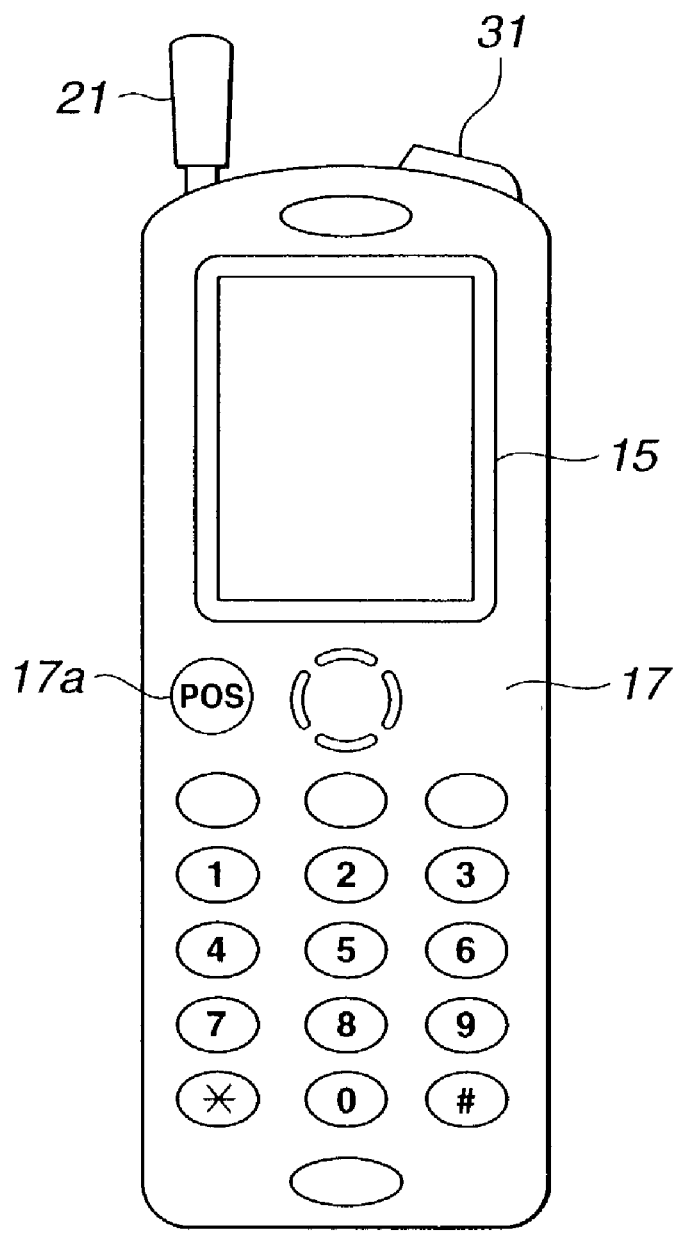
FIG. 1 shows the appearance of a portable telephone device as an embodiment of the present invention.

First, a portable telephone device 10 having appearance shown in FIG. 1 will be described. This portable telephone device 10 has a present position determination function and a position determination information sending function, as well as a basic function to send and receive at least an audio signal to and from a desired communicating party via a base station.

Figure 2:
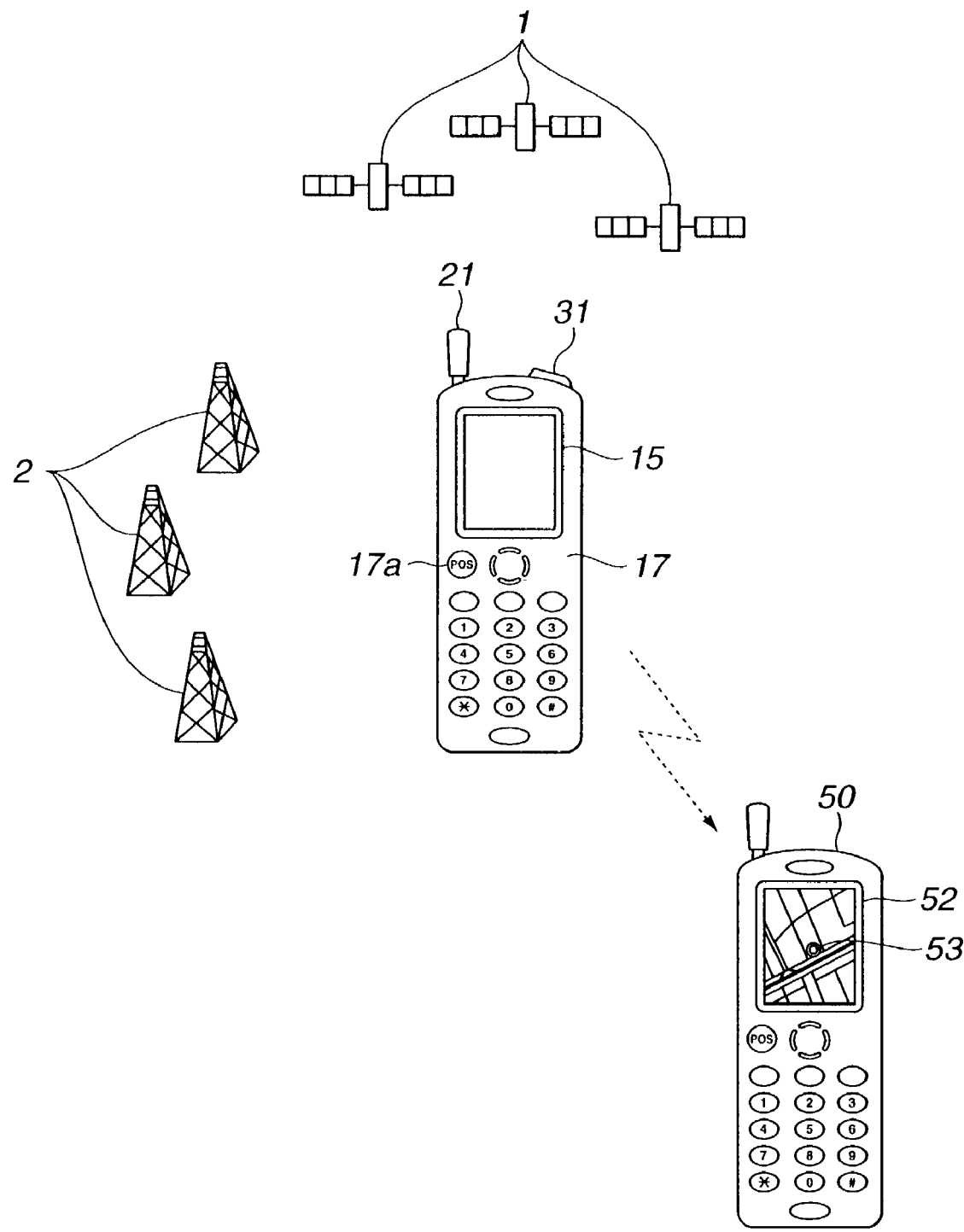
FIG. 2 is a view for explaining a specific example of a present position determination function of the portable telephone device and a specific example of a position determination information sending function.

The present position determination function includes two functions, that is, a function to receive GPS signals from GPS satellites 1 shown in FIG. 2 and a function to receive base station signals from portable telephone base stations 2 for measuring the position. The function to receive GPS signals involves a GPS antenna 31. The function to receive portable telephone base station signals for measuring the position involves a portable telephone communication antenna 21. The portable telephone device 10 has an LCD display unit 15 arranged on its upper front part. The portable telephone device 10 also has a built-in battery for driving the equipment. The portable telephone device 10 also has a dedicated hardware button 17a for sending the present position, provided on a key input unit 17 as input means. This dedicated hardware button 17a for sending the present position is hereinafter referred to as POS button 17a (abbreviation of position). When the POS button 17a is pressed by a user, the portable telephone device 10 determines that a decision operation by the user via user interface means was carried out, and controls the position determination information sending function.

In the position determination technique based on the GPS, using a C/A (coarse/acquisition) code included in L1 radio waves with a carrier frequency of 1575.42 MHZ sent from three or more of 24 satellites orbiting at an altitude of approximately 20,000 km, the distance between a mobile unit and the satellites is found, thus calculating the position of the mobile unit.

In the technique for calculating the present position by receiving a signal of a portable telephone base station, the distance between the base station and a mobile unit is calculated from the phase difference of radio waves and the present position is calculated by using triangular survey on the basis of this distance, as disclosed in the Japanese Patent Application No. 2001-45549 and the Japanese Publication of Unexamined Patent Application No. H10-322752.

For example, the Japanese Patent Application No. 2001-45549 discloses a mobile communication system using such a technique that "a mobile machine for acquiring position information receives an information channel which is periodically sent from a base station, and acquires the contents and reception timing of this information channel. The mobile machine searches a database, and adds a new transmission source if it has not been registered to the database yet. Moreover, if the transmission timing of the information channel need be acquired, the mobile machine acquires the transmission timing and calculates a propagation delay of the information channels from the transmission timing and the reception timing of the information channels or a propagation delay difference between a plurality of periodic information channels. Then, from the propagation delay or propagation delay difference, mobile machine position information is calculated and outputted."

Moreover, for example, the Japanese Publication of Unexamined Patent Application No. H10-322752 discloses a method for estimating the position of a mobile station in cellular mobile communication, a base station device and a mobile station device, using such a technique that "a mobile station device converts a first unique signal sequence PN1 from a PN1 generator to a predetermined format by using a transmission signal processing unit, and sends the resulting signal as a position estimation reference signal from a transmitting unit to a base station device. The base station device sends a second unique signal sequence PN2 from a PN2 generator to a mobile station synchronously with the first unique signal sequence PN1 received by a receiving unit. The mobile station compares the phase of the first unique signal sequence PN1 which it transmitted with the phase of the second unique signal sequence PN2 which it received, by using a phase comparison unit to find a phase difference, and calculates an estimate distance between the base station and the mobile state on the basis of the phase difference by using a distance calculation unit, thus estimating the position of the mobile station."

Meanwhile, the position determination information sending function is a data communication function. It may be implemented by PDC, CDMA, PHS or W-CDMA. Moreover, it may also use a technique for carrying out data communication based on an Internet connecting function using "compact HTML", which is a description language for compact portable information terminals. The "i-mode" system in Japan or GPRS in Europe may also be used.

As shown in FIG. 2, the portable telephone device 10 sends position determination information obtained by using a GPS unit including the GPS antenna 31, which will be described later, and/or a portable telephone signal position determination processing unit including the portable telephone communication antenna 21, which will be described later, to another portable telephone device 50 as a desired communication party via a base station by using the data communication function. This another portable telephone device 50 displays a map image of the vicinity of the received position determination information onto an LCD display unit 52 using an embedded digital map display application or the like, and also displays a present position point 53 of the portable telephone device 10 on the map image.

Figure 3:
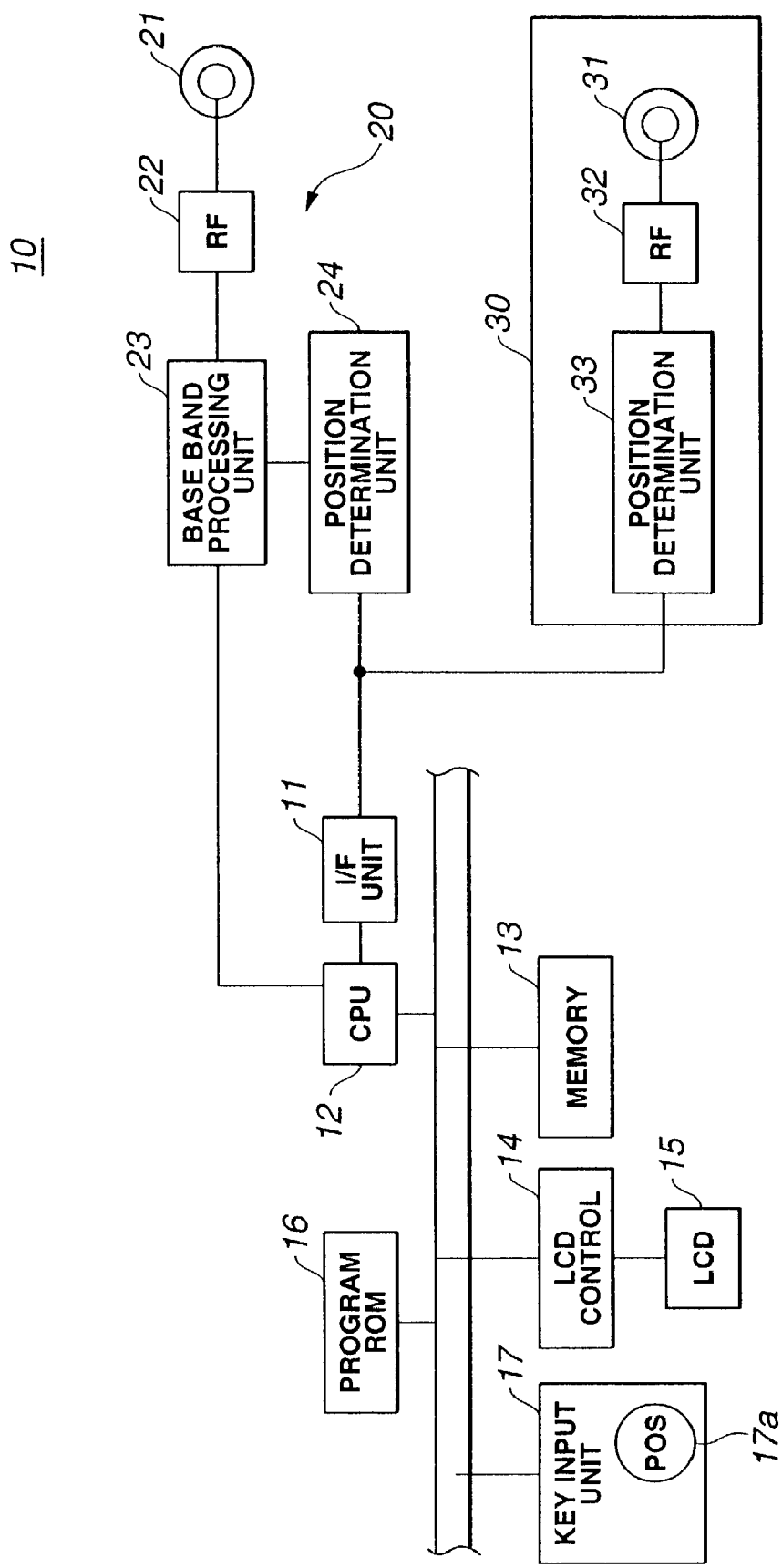
FIG. 3 is a block diagram showing the internal structure of the portable telephone device.

FIG. 3 shows a block diagram of the portable telephone device 10.

The portable telephone device 10 has a portable telephone signal position determination processing unit 20 for receiving a signal for portable telephone and measuring the present position, which is a specific example of the function to receive base station signals from the portable telephone base stations 2 for measuring the position. Radio waves from the portable telephone base stations 2 are received at the portable telephone antenna 21, and signal extraction is performed at an RF processing unit 22. Signal processing is performed at a base band processing unit 23. Then, a phase difference of the processed signal is measured at a position determination unit 24, thus finding the latitude and longitude of the present position as position determination information by calculation.

The portable telephone device 10 also has a GPS unit 30 for receiving GPS signals and measuring the present position, which is a specific example of the function to receive GPS signals from the GPS satellites 1. From radio waves received at the GPS antenna 31, signal extraction is performed at an RF processing unit 32. The latitude, longitude and altitude of the present position and the present time are found as position determination information by calculation at a position determination unit 33.

The present position and time data, which are the position determination information of the present position calculated at the portable telephone signal position determination processing unit 20 and the GPS unit 30, are sent to a CPU 12 through an interface (I/F) unit 11.

The position determination information including the latitude, longitude and altitude of the present position and the present time, sent to the CPU 12, passes through a communication control unit, which operates as the data communication function. Then, signal processing is performed on the position determination information at the base band processing unit 23, and the position determination information is carried on a transmission wave at the RF unit 22. The resulting transmission wave is sent from the portable telephone antenna 21.

The portable telephone device 10 also has the LCD 15 so that necessary display data can be displayed on the LCD 15 via an LCD controller 14 from the CPU 12.

The portable telephone device 10 also has a program ROM 16 provided therein. In the program ROM 16, an operating system (OS), and application software to be executed in accordance with this OS, specifically, a program for measuring the present position and sending the position data to another device, are stored. These programs are taken out to a memory 13 by the CPU 12 and executed by using the memory 13 as a work area.

In the portable telephone device 10, the key input unit 17 including the POS button 17a is connected to the CPU 12 via a bus. When the POS button 17a is pressed by the user, the CPU 12 determines that a decision operation is made through the user interface means.

A first example of use of the portable telephone device 10 will now be described with reference to the flowchart of FIG. 4. In this first example of use, the CPU 12 executes the application software for measuring the present position and sending the position data to another device, stored in the program ROM 16. It is assumed that this application software is executed when the portable telephone device 10 is already connected for communication with another device, for example, another portable telephone device 50, via a base station.

First, the portable telephone device 10 determines at step S1 whether position determination is possible or not. If position determination is possible (YES), the processing goes to step S2 and the present position is calculated by the above-described GPS unit 30 and/or portable telephone signal position determination processing unit 20.

The notation of "GPS unit 30 and/or portable telephone signal position determination processing unit 20" is based on the fact that as the portable telephone device 10 is carried by the user, only one of the GPS unit 30 and the portable telephone signal position determination processing unit 20 can be used, depending on the place and the signal receiving status. It is also taken into consideration that when both units can be used, the use may select one of the units or may calculate and use an average of the present position data and time data obtained from both units.

If the CPU 12 determines at step S3 that the POS button 17a was pressed by the user, the portable telephone device 10 proceeds to step S4. The present position data calculated at step S2 is passed through the communication control unit and signal processing is performed thereon by the base band processing unit 23. The resulting signal is carried on a transmission wave at the RF unit 22 and then sent from the portable telephone antenna 21. That is, the data communication function is caused to operate.

Figure 4:
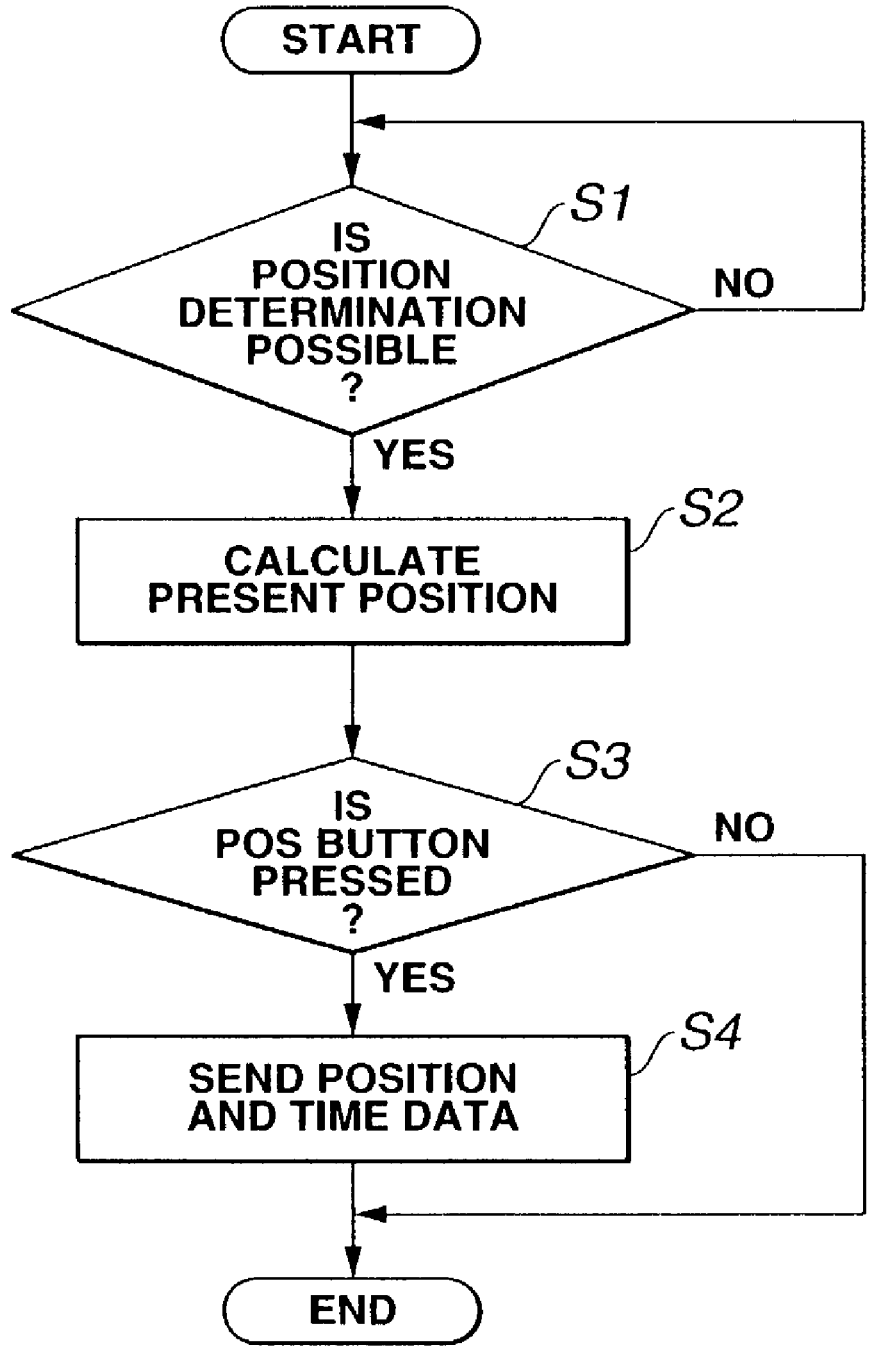
FIG. 4 is a flowchart for explaining a first example of use of the portable telephone device.

According to the first example of use in which the application software shown in FIG. 4 is executed, the portable telephone device 10 can allow the user to consciously send the determined present position to another portable telephone device 50. Particularly, in this first example of use, the present position is constantly calculated, and only when the POS button 17a is pressed, the present position is sent. Another portable telephone device 50 displays a map image of the vicinity of the received position determination information onto the LCD display unit 52 using an embedded digital map display application or the like, and also displays the present position point 53 of the portable telephone device 10 on the map image.

A second example of use of the portable telephone device 10 will now be described with reference to the flowchart of FIG. 5. In this second example of use, too, the CPU 12 executes the application software for measuring the present position and sending the position data to another device, stored in the program ROM 16. Again, it is assumed that this application software is executed when the portable telephone device 10 is already connected for communication with another device, for example, another portable telephone device 50, via a base station.

First, the portable telephone device 10 determines at step S11 whether or not the POS button 17a was pressed, using the CPU 12. If the CPU 12 has determined that the POS button 17a was pressed, whether position determination is possible or not is determined at step S12. If position determination is possible, the processing goes to step S13 and the portable telephone device 10 calculates the present position by using the above-described GPS unit 30 and/or portable telephone signal position determination processing unit 20.

Then, in the portable telephone device 10, the present position data calculated at step S13 is passed through the communication control unit and signal processing is performed thereon by the base band processing unit 23. The resulting signal is carried on a transmission wave at the RF unit 22 and then sent from the portable telephone antenna 21. That is, the data communication function is caused to operate.

Figure 5:
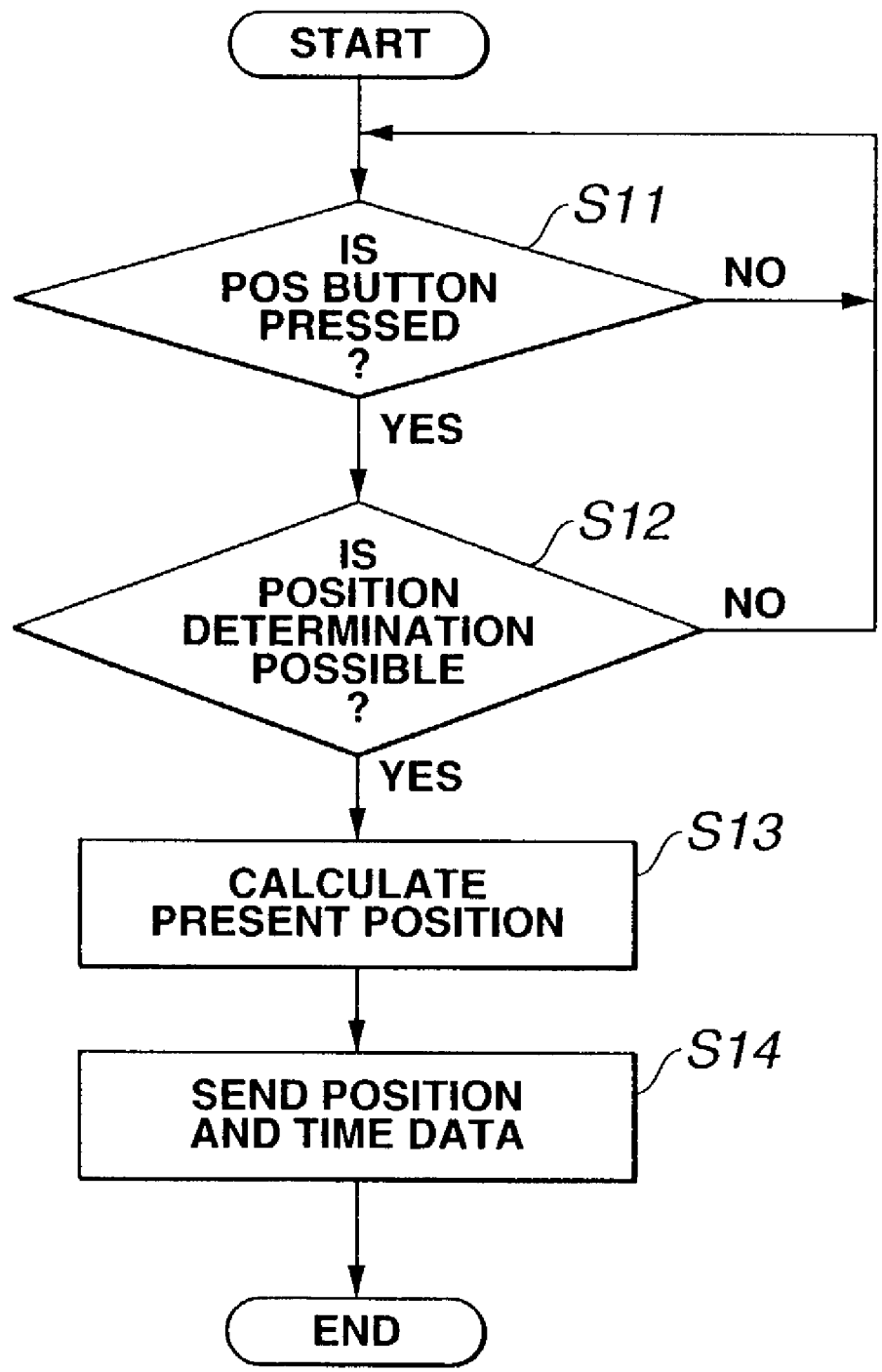
FIG. 5 is a flowchart for explaining a second example of use of the portable telephone device.

According to the second example of use in which the application software shown in FIG. 5 is executed, the portable telephone device 10 can allow the user to consciously send the determined present position to another portable telephone device 50. Particularly, in this second exemplary operation, the present position is measured only when the POS button 17a is pressed, and if the present position can be measured, the present position data is sent subsequently. Another portable telephone device 50 displays a map image of the vicinity of the received position determination information onto the LCD display unit 52 using an embedded digital map display application or the like, and also displays the present position point 53 of the portable telephone device 10 on the map image.

A third example of use of the portable telephone device 10 will now be described with reference to FIG. 6. In this third example of use, when the POS button 17a is pressed, position information calculated in the portable telephone device 10 is sent to another portable device 50 or a personal computer 60 via the Internet 70, which is a specific example of network means.

Figure 6:
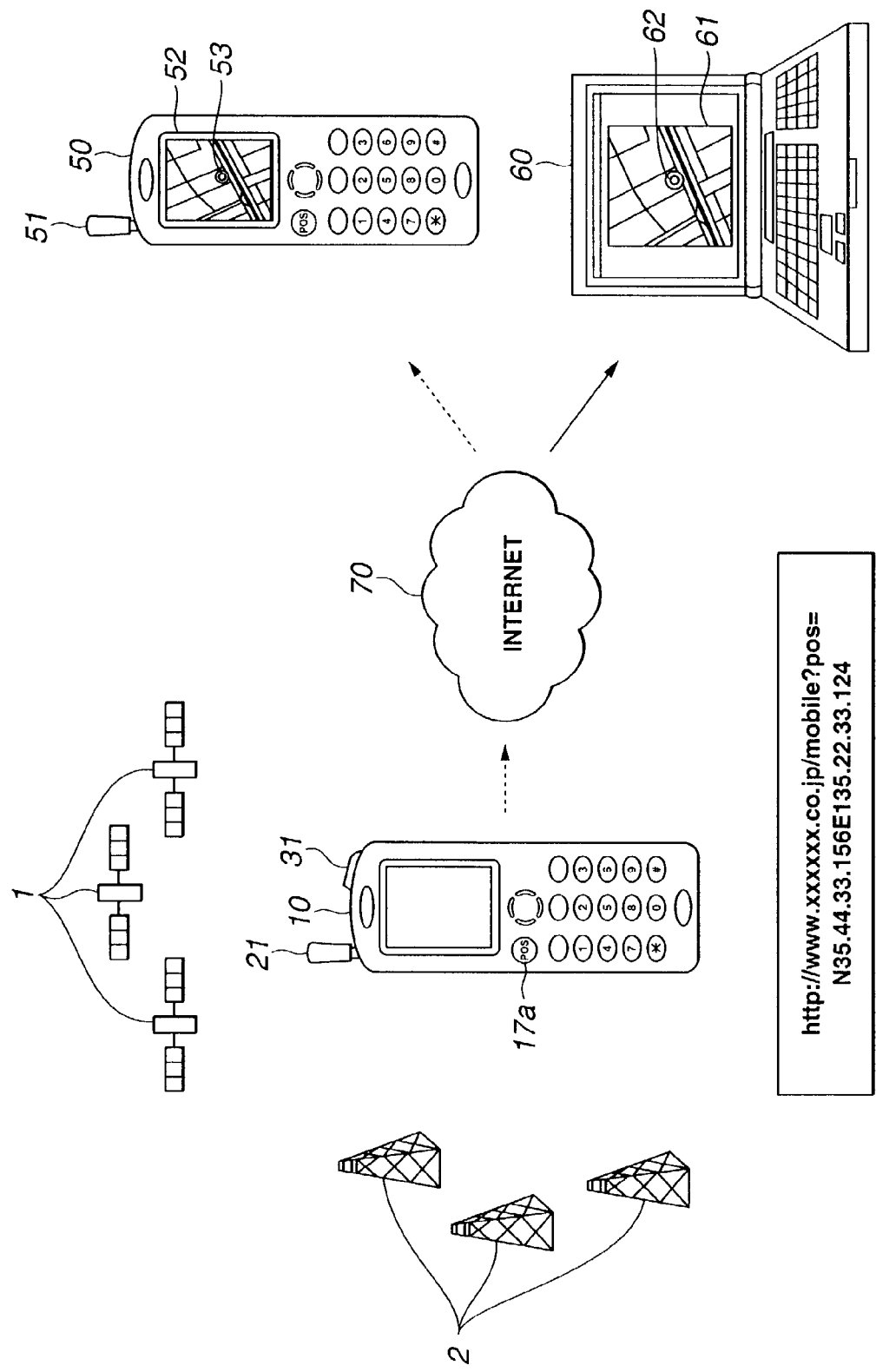
FIG. 6 is a view for explaining a third example of use of the portable telephone device.

As a specific example of transmission of the position information, FIG. 6 shows an exemplary description in the case of adding the position information to URL and sending the URL with the position information. As a method for describing the position information in the URL, a position information URL standard for mobile tool (MOPA) established by the Mobile Office Promotion Association. For example, such a description as "http://www.xxxxxx.co.jp/mobile?pos=N35.44.33.156E135.22.33. 124" is used. The position information "?pos=N35.44.33.156E135.22.33.124" is added to the position information URL "http://www.xxxxxx.co.jp/mobile". This is only an example and various means based on applications and communication means may be considered as the format for sending the position information.

Another portable telephone device 50 displays a map image of the vicinity of the received position information onto the LCD display unit 52 using an embedded digital map display application or the like, and also displays the present position point 53 of the portable telephone device 10 on the map image.

Similarly, the personal computer 60 displays a map image of the vicinity of the received position information onto a LCD display unit 61 using an embedded digital map display application or the like, and also displays a present position point 62 of the portable telephone device 10 on the map image.

An example of the device capable of receiving the position information from the portable telephone device 10 via the Internet 70 and displaying the position information, for example, as a present position point on a map image on an LCD display unit, may be a personal digital assistant (PDA), a desktop computer, a stationary telephone device, a television receiver or the like.

A fourth example of use of the portable telephone device 10 will now be described with reference to FIG. 7 and FIGS. 8A and 8B.

Figure 7:
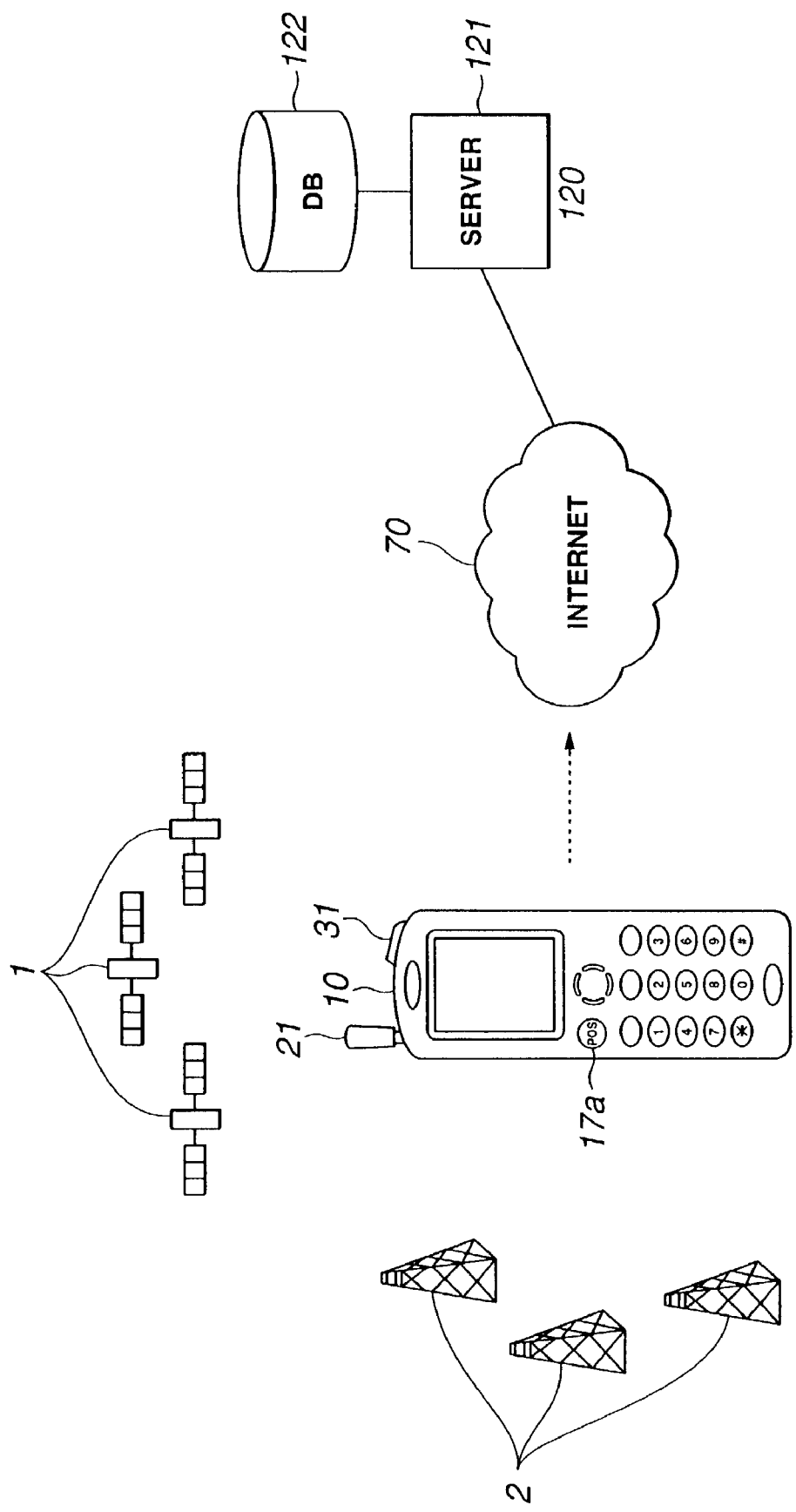
FIG. 7 is a view for explaining a fourth example of use of the portable telephone device.

In this fourth example of use, as shown in FIG. 7, when the POS button 17a is pressed, for example, during search (browsing) of guide information of an area (tourist resort or the like) by the portable telephone device 10 from a server 121 on an information provider side 120 connected to the Internet 70, a screen related to the position where the owner of the portable telephone is present can be immediately displayed in accordance with position information calculated by the portable telephone device 10. In this case, by starting up the browser, the portable telephone device 10 can search the guide information of the area (tourist resort or the like) taken out from a database 122 by the server 121 on the information provider side 120.

Figure 8A:
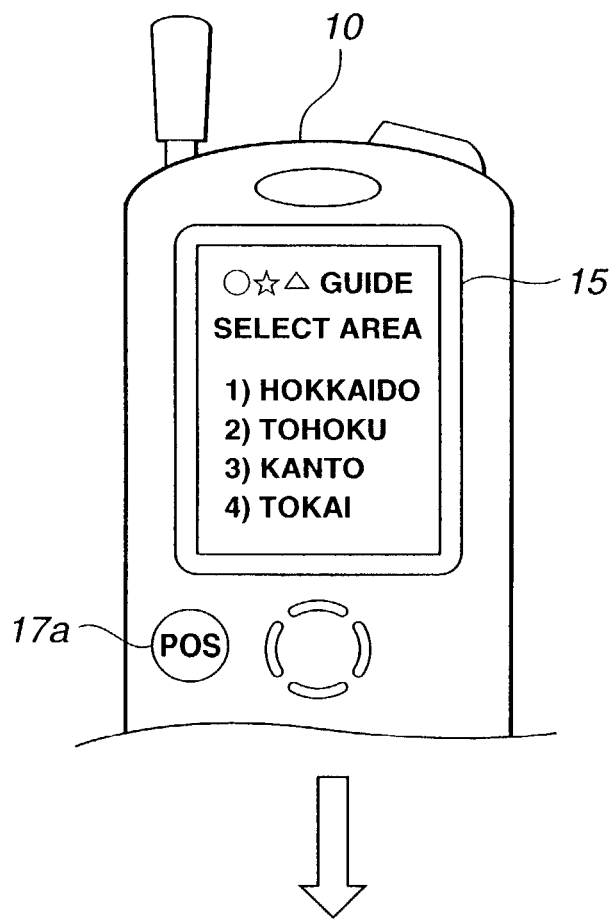
FIGS. 8A and 8B are views for explaining an exemplary display in the fourth example of use of the portable telephone device.
Figure 8B:
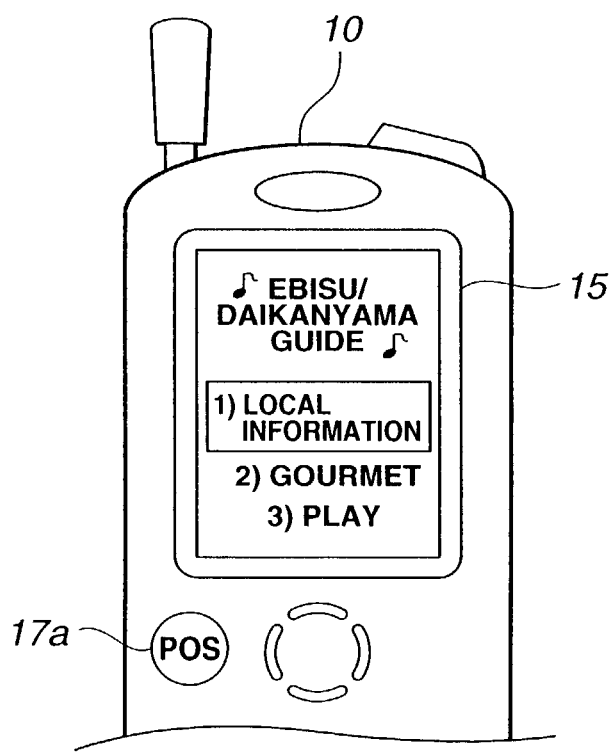

A specific example of the display on the LCD display unit 15 of the portable telephone device 10 on the basis of such an example of use is shown in FIGS. 8A and 8B. First, as the owner of the portable telephone presses the POS button 17a, for example, during search (browsing) of guide information of an area (tourist resort or the like) from the server 121 on the information provider side 10, as shown in FIG. 8A, the portable telephone device 10 detects its position from the position information and enables immediate display of a screen related to that position, for example, local information of "Ebisu/Daikanyama guide" via the browser, as shown in FIG. 8B.

As described above, in the portable telephone device 10, the present position data calculated by the GPS unit 30 and/or the portable telephone signal position determination processing unit 20 is passed through the communication control unit while the user operating the POS button 17a is aware of it. Signal processing is performed on the present position data by the base band processing unit 23 and the resulting signal is carried on a transmission wave by the RF unit 22. Then, it is sent to another device from the portable telephone antenna 21 via a base station or through the Internet.

Particularly, in the first example of use, the present position is constantly calculated, and only when the POS button 17a is pressed, the present position is sent. As the present position data is sent only when the user presses the POS button 17a, the power can be saved and the communication cost can be reduced at the same time. Moreover, since the present position data of the portable telephone device itself is constantly calculated, the present position data can be immediately sent to, for example, another portable telephone device 50 when the POS button 17a is pressed.

Another portable telephone device 50 displays a map image of the vicinity of the received present position data onto the LCD display unit 52 using an embedded digital map display application or the like, and also displays the present position point 53 of the portable telephone device 10 on the map image.

Particularly, in the second example of use, the present position is measured only when the POS button 17a is pressed, and if the present position can be measured, the present position data is sent subsequently. Since the present position data is calculated only when the user presses the POS button 17a, the power can be saved.

Another portable telephone device 50 displays a map image of the vicinity of the received position determination information onto the LCD display unit 52 using an embedded digital map display application or the like, and also displays the present position point 53 of the portable telephone device 10 on the map image.

Particularly, in the third example of use, when the POS button 17a is pressed, the position information calculated in the portable telephone device 10 is sent to another portable telephone device 50 or the personal computer 60 via the Internet 70.

Another portable telephone device 50 or the personal computer 60 displays a map image of the vicinity of the received position information onto the LCD display unit 52 or 61 using an digital map display application or the like, and also displays the present position point 53 or 62 of the portable telephone device 10 on the map image.

Moreover, in the portable telephone device 10, as described in the fourth example of use, when the POS button 17a is pressed, for example, during search (browsing) of an area (tourist resort or the like) from the server 121 on the information provider side 120 connected to the Internet 70, a screen related to the position where the owner of the portable telephone is present can be immediately displayed in accordance with the position information calculated in the portable telephone device 10. In the fourth example of use, the portable telephone device 10 does not send the present position data to another device.

Figure 9:
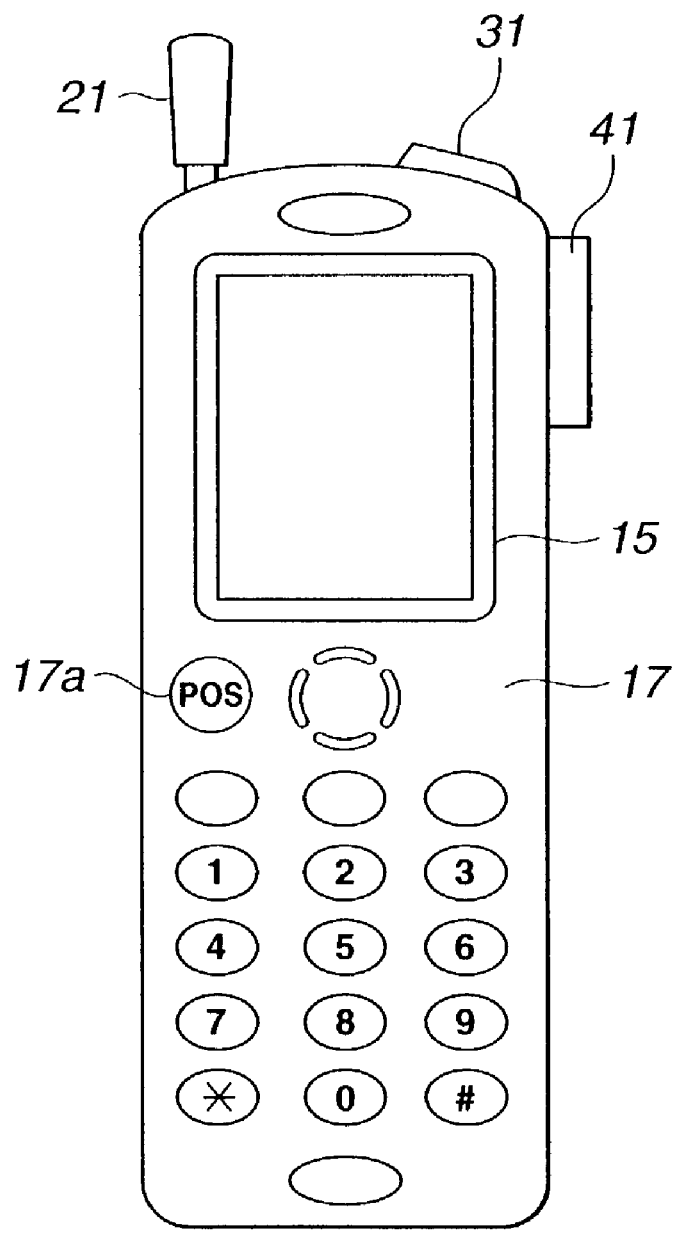
FIG. 9 shows the appearance of a portable telephone device as another embodiment of the present invention.

A portable telephone device 40 having an appearance shown in FIG. 9, as another embodiment of the present invention, will now be described. This portable telephone device 40, too, has a present position determination function and a position determination information sending function, as well as a basic function to send and receive at least an audio signal to and from a desired communicating party via a base station. However, this portable telephone device 40 has a local radio communication function which enables sending and receiving of data to and from a device in the surrounding area in addition to the data communication function, as the position determination information sending function. The local radio communication function is made effective as a local radio communication unit 41 operates.

A radio technique based on the local radio function is a radio communication technique called Bluetooth, using an ISM (industrial, scientific and medical) band of 2.4 GHz which is the same as the bans used for wireless LAN (WLAN) communication conformable to the IEEE802.11 standard, for example, for direct sequent spread spectrum (DSSS) radio communication or the like. Generally, this radio communication technique is suitable for transferring data to another device at a distance of 10 m or less.

Figure 10:
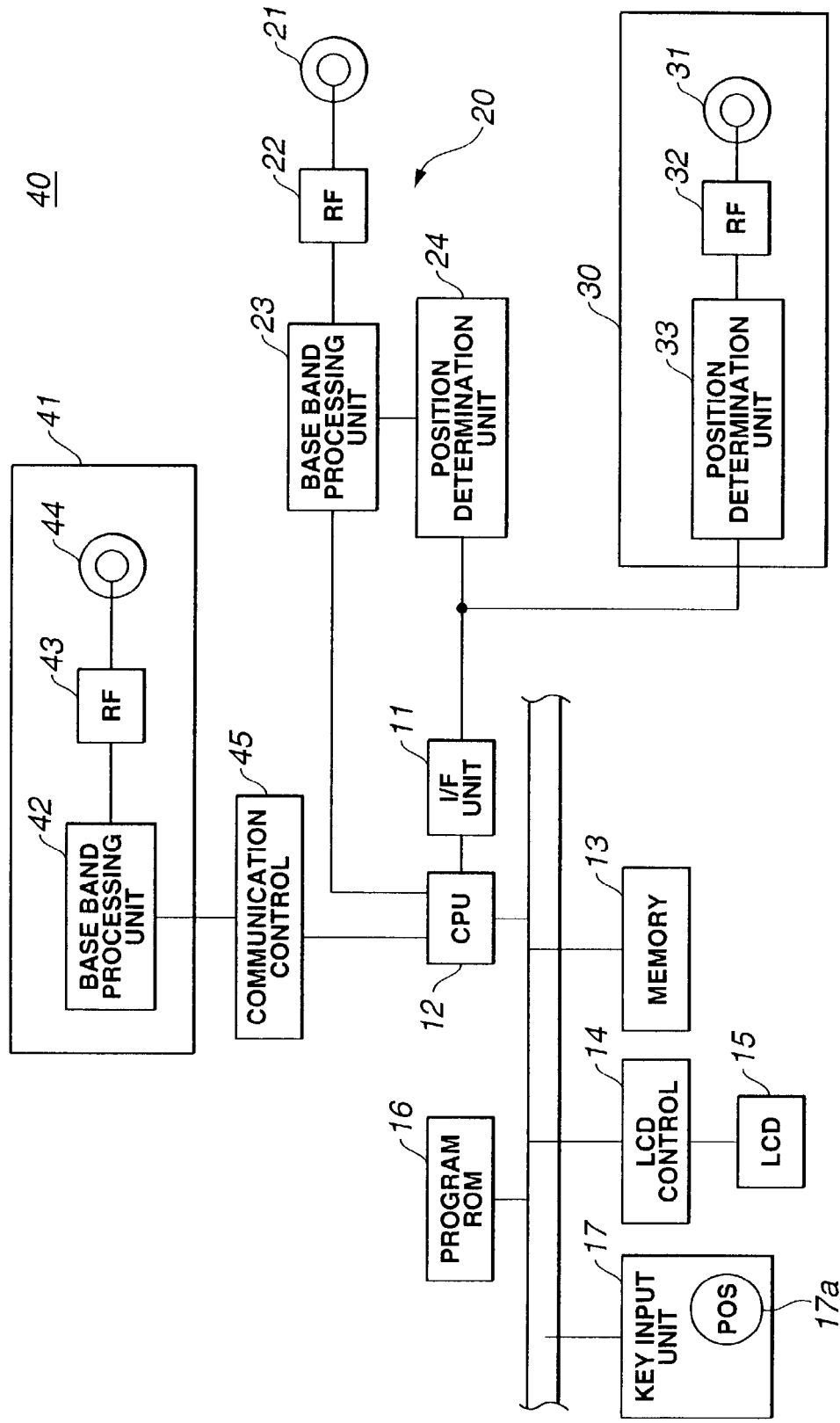
FIG. 10 is a block diagram showing the internal structure of the portable telephone device shown in FIG. 9.

FIG. 10 shows the internal structure of the portable telephone device 40. The constituent parts except for the local radio communication unit 41 and a communication control unit 45 are the same as those of the internal structure of the foregoing portable telephone device 10 shown in FIG. 3. The local radio communication unit 41 can send and receive data to and from a device in the surrounding area, as described above. The present position data to be sent by the portable telephone device 40 is passed through the communication control unit 45 from the CPU 12, and signal processing is performed thereon by a base band processing unit 42 of the local radio communication unit 41. The resulting signal is carried on a transmission wave by an RF processing unit 43 and is thus sent by radio transmission from a local radio communication antenna 44 to a device in the surrounding area. On the other hand, radio waves send by radio transmission from a device in the surrounding area is received by the local communication antenna 44 and signal extraction is performed by the RF unit 43. Signal processing is performed on the extracted signal by the base band processing unit 42 and the resulting signal is transmitted to the CPU 12 via the communication control unit 45.

Again, the description of the first example of use and the second example of use of the portable telephone device 10 may be applied to this portable telephone device 40. However, the processing of step S4 of FIG. 4 in the first example of use and the processing of step S14 of FIG. 5 in the second example of use differ.

First, in the first example of use, the portable telephone device 40 determines at step S1 whether position determination is possible or not. If position determination is possible (YES), the processing goes to step S2 and the present position is calculated by the above-described GPS unit 30 and/or portable telephone signal position determination processing unit 20.

If the CPU 12 determines at step S3 that the POS button 17a was pressed by the user, the portable telephone device 40 proceeds to step S4 and carries out data communication or local radio communication of the present position data calculated at step S2. The data communication or local radio communication at step S4 will be described later in detail.

In the second example of use, the portable telephone device 40 determines at step S11 whether the POS button 17a was pressed or not, by using the CPU 12. If the CPU 12 determines that the POS button 17a was pressed, whether position determination is possible or not is determined at step S12. If position determination is possible, the processing goes to step S13 and the portable telephone device 40 calculates the present position by using the above-described GPS unit 30 or portable telephone signal position determination unit 20.

Then, the portable telephone device 40 carries out data communication or local radio communication of the present position data calculated at step S13. The data communication or local radio communication at this step S14 will be described hereinafter.

Figure 11:
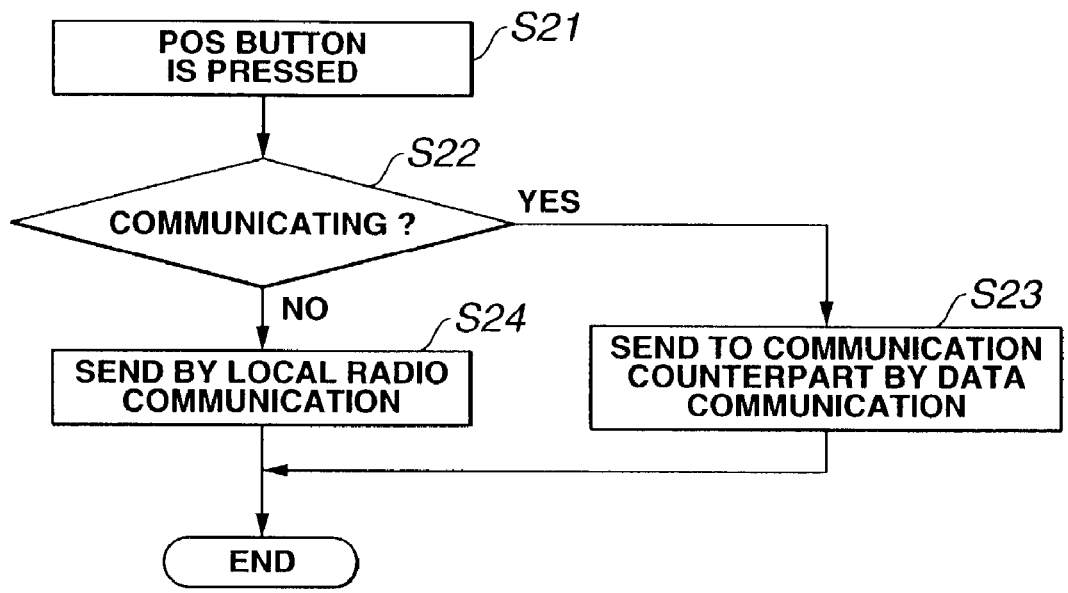
FIG. 11 is a flowchart for explaining a first specific example corresponding to an operation of a POS button in a portable telephone device having both a data communication function and a local radio communication function.
Figure 12:
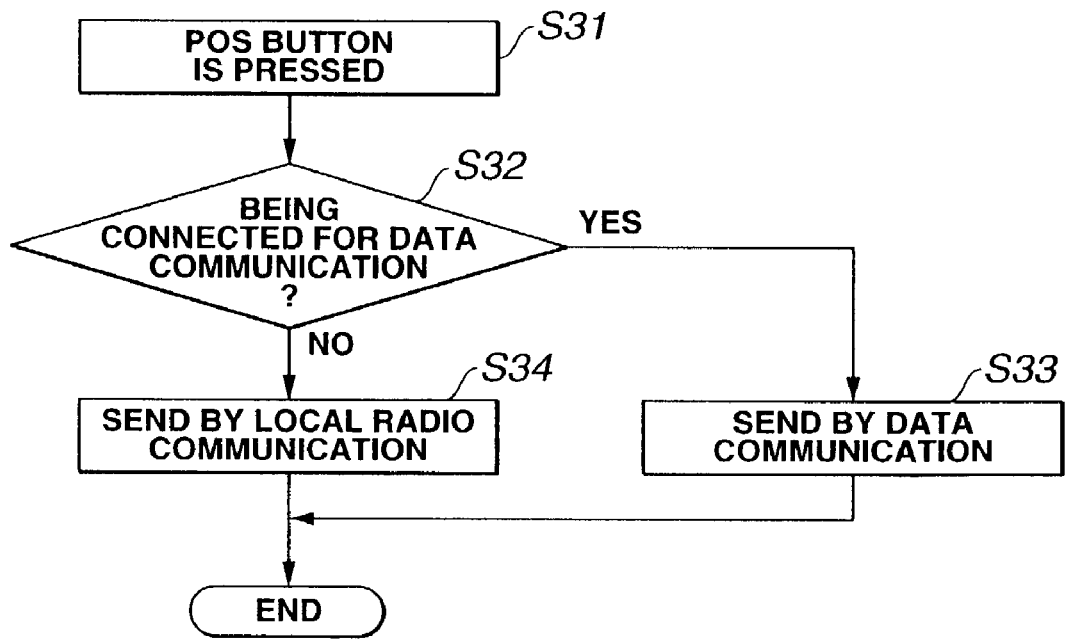
FIG. 12 is a flowchart for explaining a second specific example corresponding to an operation of the POS button in the portable telephone device having both the data communication function and the local radio communication function.
Figure 13:
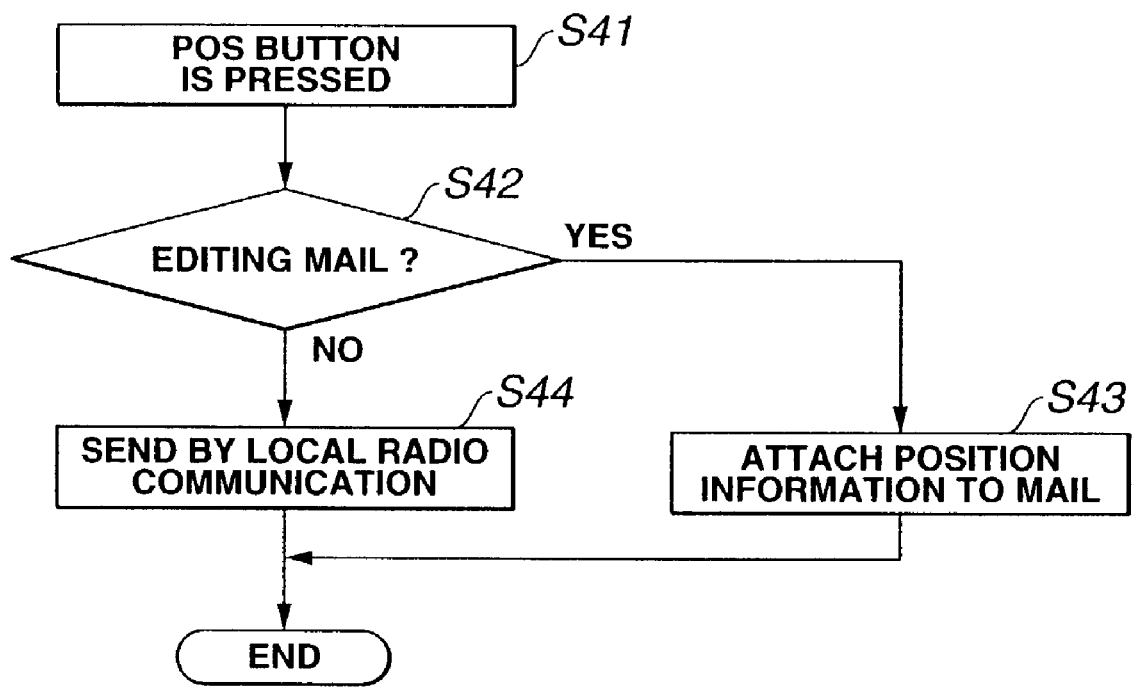
FIG. 13 is a flowchart for explaining a third specific example corresponding to an operation of the POS button in the portable telephone device having both the data communication function and the local radio communication function.

FIGS. 11 to 13 show specific examples of processing for automatically selecting one of the two communication means by using the single POS button 17a, in the portable telephone device 40 having both the data communication function and the local radio communication function.

First, an example of processing which varies depending on whether or not the portable telephone device 40 is communicating with another portable telephone device 50 when the POS button 17a is pressed, will be described with reference to FIG. 11. As the CPU 12 determines at step S21 that the POS button 17a was pressed, if it is determined at step S22 that communication is being carried out (YES), the portable telephone device 40 at step S23 sends the present position data to another portable telephone device 50 as a communicating counterpart, by using the data communication function. If it is determined at step S22 that communication is not being carried out (NO), the portable telephone device 40 at step S24 sends the present position data to a device in the neighborhood, for example, a device in the surrounding area within a range of 10 m, by using the local radio communication unit 41.

Next, an example of processing which varies depending on whether or not information of homepage or the like is being browsed through the Internet when the POS button 17a is pressed, will be described with reference to FIG. 12. As the CPU 12 determines at step S31 that the POS button 17a was pressed, if it is determined at step S32 that data communication connection is being connected with a browsing site for data communication (YES), the portable telephone device 40 at step S33 sends the present position data to the browsing site by using the data communication function. If it is determined at step S32 that communication is not being carried out (NO), the portable telephone device 40 at step S34 sends the present position data to a device in the surrounding area as described above, by using the local radio communication unit 41.

Next, an example of processing which varies depending on whether or not an electronic mail is being edited when the POS button 17a is pressed, will be described with reference to FIG. 13. As the CPU 12 determines at step S41 that the POS button 17a was pressed, if it is determined at step S42 that an electronic mail is being edited (YES), the portable telephone device 40 at step S43 attaches the position data to the electronic mail. If it is determined at step S42 that an electronic mail is not being edited (NO), the portable telephone device 40 at step S44 sends the present position data to a device in the surrounding area as described above, by using the local radio communication unit 41.

The processing for automatically selecting one of the two present position data sending means, carried out at steps S4 and S14, in the examples of use where FIGS. 4 and 5 are applied to the portable telephone device 40, is described above.

As described above, in the portable telephone device 40, with respect to the present position data calculated by the GPS unit 30 and/or the portable telephone signal position determination processing unit 20, signal processing is performed by the base band processing unit 23 while the user operating the POS button 17a is caused to be aware of it. The resulting signal is carried on a transmission wave by the RF unit 22 and thus may be sent by data communication from the portable telephone antenna 21 to another device via a base station or the Internet. Alternatively, the present position data may be sent to a device in the surrounding area by using the local radio communication unit 41.

The two sending functions, that is, the data communication function and the local radio communication function, can be automatically switched depending on the status during the operation when the POS button 17a is pressed, as described with reference to FIGS. 11 to 13.

That is, this portable telephone device 40 not only can be used in the examples of use as shown in FIGS. 6 and 7, but also it can carry out radio transmission of the position data to a device in the surrounding area by automatically switching the sending functions.

As a method for selecting the communication means for sending the position information, selection of one of the communication means when pressing the POS button 17a, or the user's selection in advance, as well as automatic selection as described above may be used.

Moreover, in the case where position information is acquired by position determination using the GPS unit 30, date and time information can also be acquired as well as latitude and longitude information. Therefore, the date and time information can be sent similarly.

In addition to the above-described examples of use, the portable telephone device 10 and the portable telephone device 40 can be also be used as in the following description.

First, a modification of the example shown in FIG. 7 will be described. If the POS button 17*a* is pressed when browsing information for which an area or a place is to be selected, such as weather information, housing information, or train (airplane, bus) transfer guide, by using the portable telephone device 10 or the portable telephone device 40, information of an area corresponding to the present position is immediately displayed on the LCD display unit of the portable telephone device 10 or the portable telephone device 40.

Next, a modification of the example shown in FIG. 2 will be described. If the POS button 17*a* is pressed while talking or sending an electronic mail or having a chat between the portable telephone devices, a map and the present positions of each other are displayed on the LCD display units of these portable telephone devices. Similarly, if the POS button 17*a* is pressed instead of a calling button for making a telephone call, the call receiver can be informed of the position of the caller.

An example in which the portable telephone device is used as a navigation device will now be described. For example, in the case where the portable telephone device 10 has a map display function together with a navigation function and these functions are actuated in association with each other, if the POS button 17*a* shown in FIG. 14A is pressed, a map and a present position point 18 are displayed on the LCD display unit 15, as shown in FIG. 14B. Preferably, in the portable telephone device which executes such functions, a rotation and press operator such as a jog dial 17*b* for carrying out scroll and enlargement/reduction of the map is provided. In this case, the jog dial 17*b* can be rotated along the longitudinal direction of the portable telephone device 10 and can be pressed in the direction of the thickness. For example, the map is enlarged as the jog dial 17*b* is rotated in one direction (upward in the drawing) along the longitudinal direction of the portable telephone device 10, whereas the map is reduced as the jog dial 17*b* is rotated downward along the longitudinal direction. When scrolling the map by rotating the jog dial 17*b*, a press operation may be used as a decision operation.

Now, an example in which position data is sent as an attachment to an electronic mail will be described. As an example of sending position data via the Internet, the latitude and longitude of the present position may be sent as an attachment to an electronic mail, instead of attaching the position data to URL as described above with reference to FIG. 6. Having received the attachment, another portable telephone device 50 or the personal computer can interpret the attachment by using embedded application software and can display the present position of the portable telephone device 10 on the map as the present position pointer 53, 62.

Another modification of the fourth example of use will now be described. In this example, when the POS button 17*a* is pressed during search (browsing) of, for example, a reservation homepage of a hotel reservation site from the server 121 on the information provider side 120 connected to the Internet 70 by using the portable telephone device 10, as shown in FIG. 7, a screen related to the position where the owner of the portable telephone is present can be immediately displayed in accordance with the position information calculated in the portable telephone device 10.

Figure 15A:
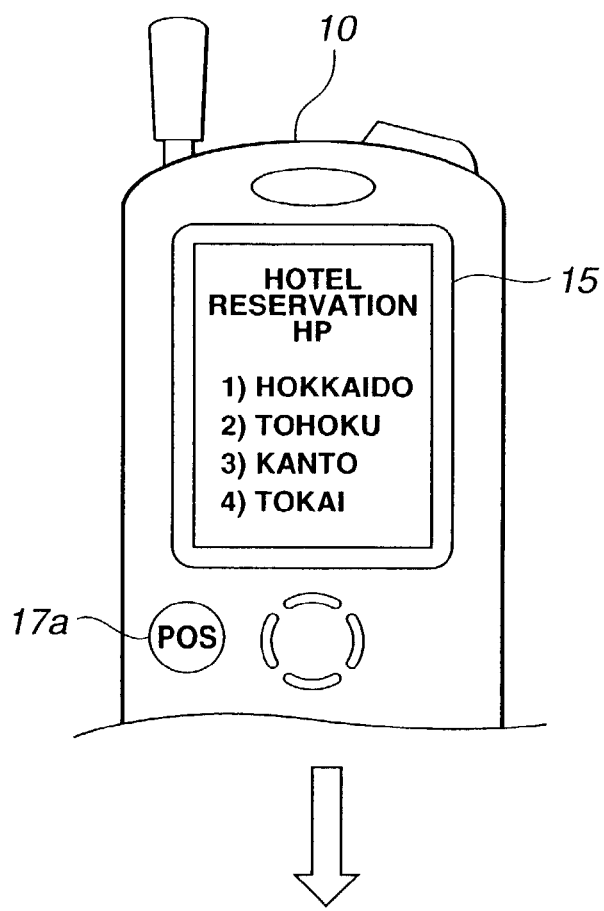
FIGS. 15A and 15B are views for explaining a specific exemplary operation when the POS button is operated in the portable telephone device during browsing from a server on an information provider side connected to the Internet.
Figure 15B:
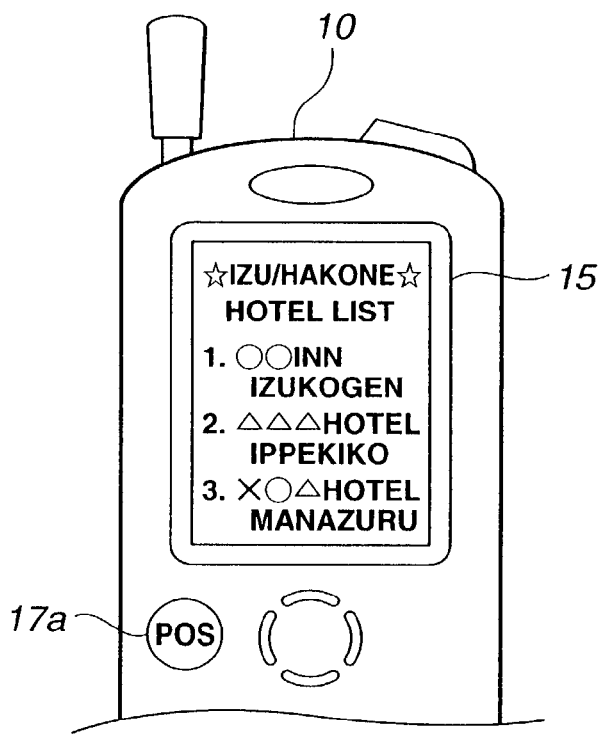

A specific example of display on the LCD display unit 15 of the portable telephone device 10 based on such an example of use is shown in FIGS. 15A and 15B. As the owner of the portable telephone presses the POS button 17*a* while browsing, for example, a hotel reservation HP, from the server 121 on the information provider side 120, the portable telephone device 10 detects its position from the position information and enables immediate display of the screen shown in FIG. 8B related to that position, for example, "Izu/Hakone hotel list", via the browser. In this case, hotels are listed and displayed in the order from the one which is closest to the position of the owner of the portable telephone. The user can select and reserve a hotel from this display.

An example of use in which present position data or the like is sent from the local radio communication unit 41 of the portable telephone device 40 to a digital camera or a portable VTR in the surrounding area, will now be described. In FIG. 16, the distance between the portable telephone device 40 and a digital camera 80 or a portable VTR 100 is 10 m or less. The digital camera 80 is equipped with a local radio communication unit 81, and the portable VTR 100 is equipped with a local radio communication unit 101.

When the user wants to record position information on a photograph taken by the digital camera 80, if the user carries the portable telephone device 40, the user can print the date and time and the name of place at a lower part of a pickup image shown as an exemplary shot, by pressing the POS button 17*a*.

Moreover, if the user carries the portable VTR 100 and the portable telephone device 40, the user can take accurate date and time information into the portable VTR 100 by pressing the POS button 17*a*.

Figure 17:
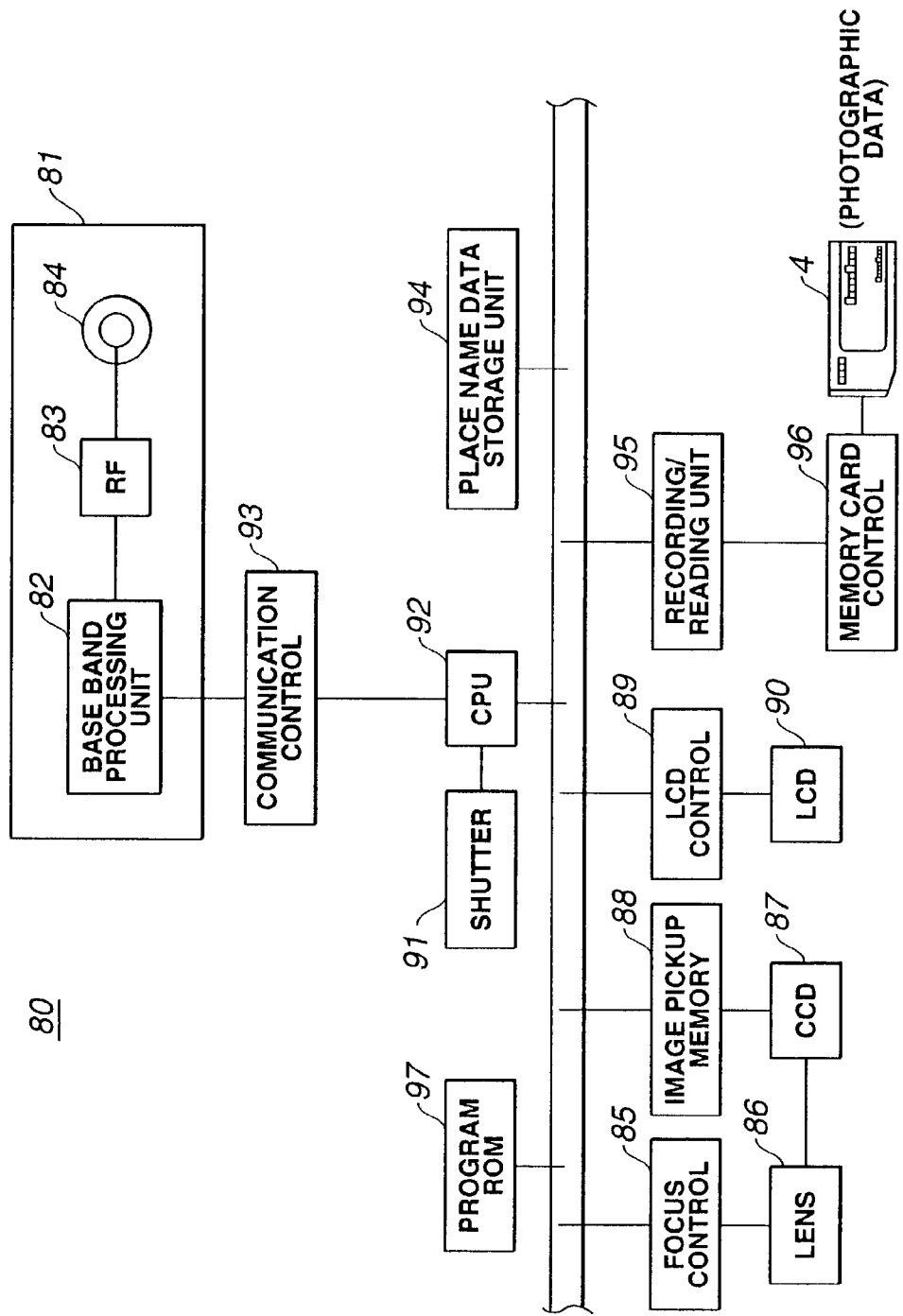
FIG. 17 shows the internal structure of the digital camera.

FIG. 17 shows the internal structure of the digital camera 80.

An image taken by photographing an object through a lens 86 with its focus adjusted by a focus control unit 85 is recorded into an image pickup memory 88 by a CCD 87 as image data in the form of a digital signal. This image is displayed on an LCD 90 through an LCD control unit 89. The user checks this image and presses a shutter 91.

Moreover, the digital camera 80 also has a local radio communication unit 81 for receiving present position data from the portable telephone device 40, a place name data storage unit 94 for printing on a photographic image the name of the place where an object is photographed, a recording/reading unit 95 for recording the photographic image to a memory card 4, and a memory card control unit 96.

Furthermore, a CPU 92 for controlling the operation of each unit via an internal bus is provided in the digital camera 80. Radio waves sent by radio transmission from the portable telephone device 40 are received by a local radio communication antenna 84. Signal extraction is performed by an RF unit 83 and signal processing is performed by a base band signal processing unit 82. The resulting signal is transmitted to the CPU 92 via a communication control unit 93.

Also a program ROM 97 is provided in the digital camera 80. An operating system (OS), and application software to be executed in accordance with the OS, for example, an application for picking up an image of an object or an application for printing the time and place name based on position data onto the picked-up image, are stored in the program ROM 97. For example, it may be an application described with reference to the flowchart of FIG. 18, which will be described later. Of course, the application based on the flowchart of FIG. 18 may be divided into several applications. For example, one of such applications may be an application for transforming present position data received by the local radio communication unit 81 to a place name by using the place name data storage unit 94, which will be described later. As the CPU 92 executes this application, the CPU 92 is provided with a function to transform present position data to a place name.

When the digital camera 80 is in a photographing standby state and present position and time data is sent thereto from the portable telephone device 40, the digital camera 80 selects an optimum place name from place name data in the place name data storage unit 94 on the basis of the latitude and longitude of the present position. When the CPU 92 recognizes that the shutter 91 was pressed, the time and place name are printed at a lower part of a picked-up image in the image pickup memory 88 and the picked-up image is recorded to the memory card 4.

Figure 18:
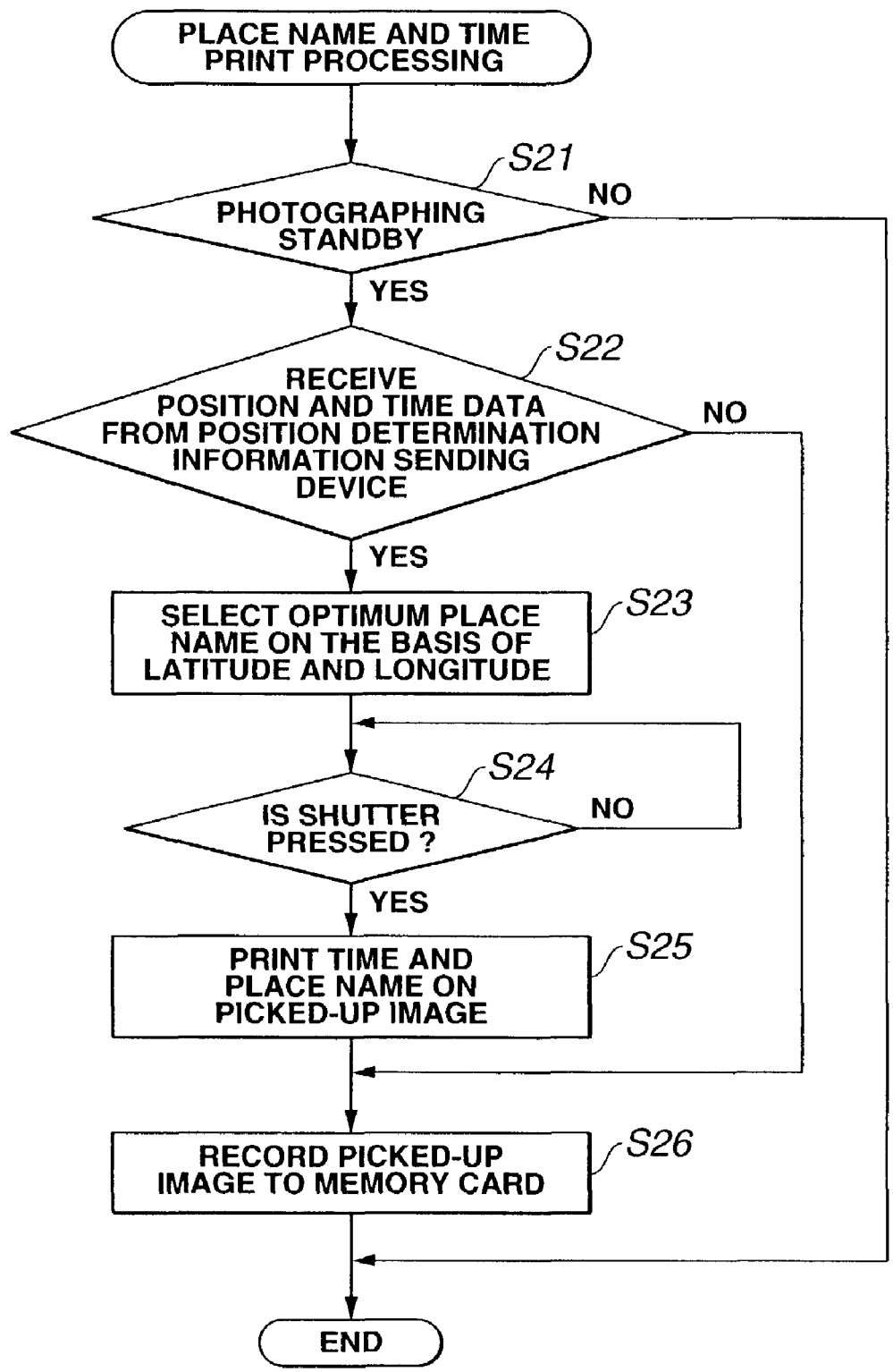
FIG. 18 is a flowchart for explaining the operation of the digital camera.

The processing on the side of the digital camera 80 during the communication between the digital camera 80 and the portable telephone device 40 will now be described with reference to the flowchart of FIG. 18.

This processing is carried out as an application program based on this flowchart is read out and executed from the program ROM 97 of FIG. 17 by the CPU 92.

First, if the digital camera 80 is in the photographing standby state (YES) at step S21 and it is determined at step S22 that present position and time data was sent thereto from the portable telephone device 40, the CPU 92 executes the application for transforming the present position data to a place name by using the place name data storage unit 94 and selects an optimum place name from the place name data in the place name data storage unit 94 on the basis of the latitude and longitude of the present position (step S23).

Then, the user selects the optimum place name. If the CPU 92 recognizes at step S24 that the shutter 91 was pressed as an enter key (YES), the time and place name are printed at a lower part of a picked-up image in the image pickup memory 88 (step S25) and the picked-up image is recorded to the memory card (step S26). The time and place name may be printed within the picked-up image, or these may be separately recorded to the memory card 4 in association with the picked-up image.

Figure 19:
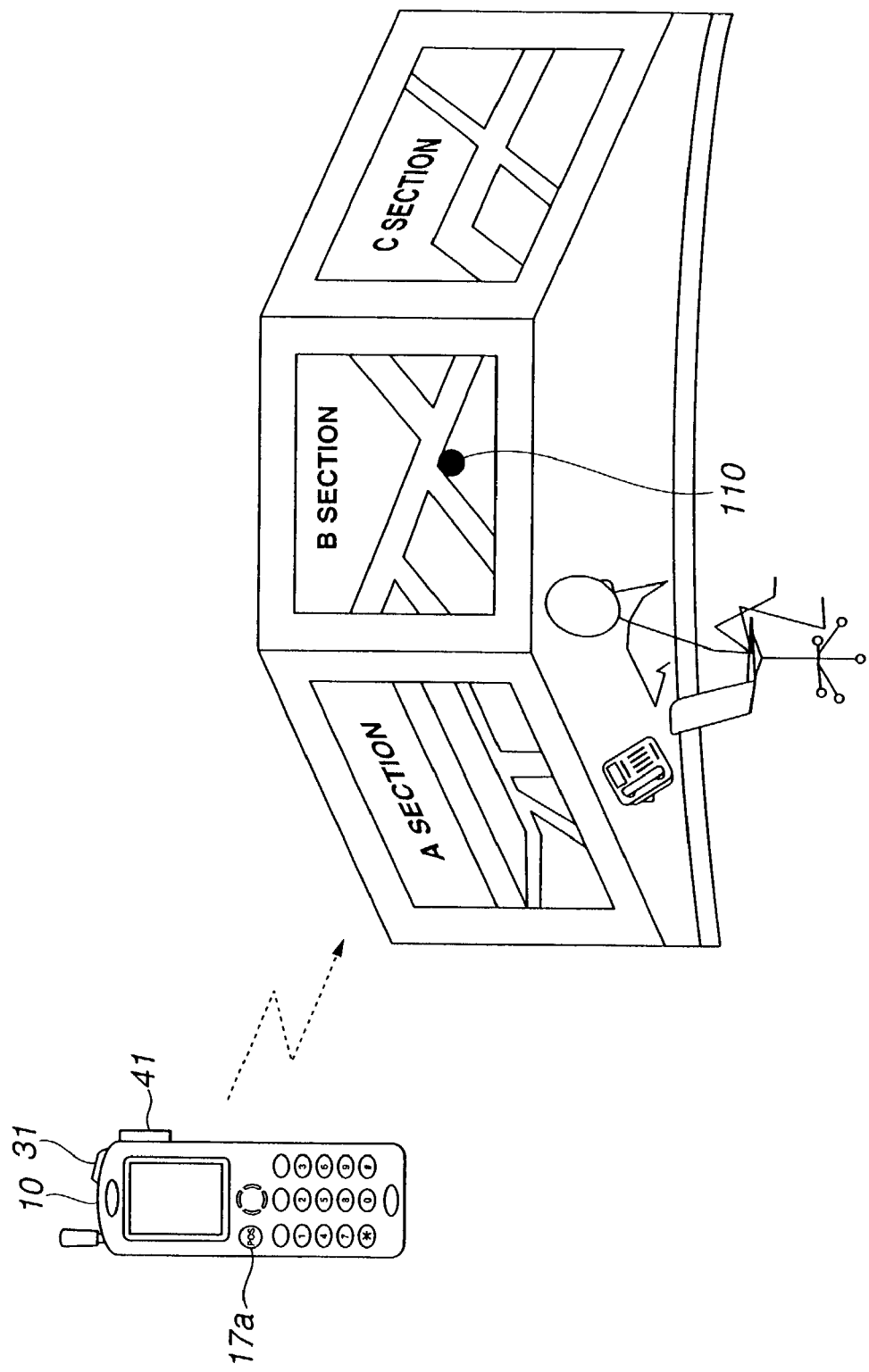
FIG. 19 is a view for explaining an example in which the POS button of the portable telephone device is used as an emergency button.

Now, an example in which the POS button 17a of the portable telephone device 10 is used as an emergency button will be described with reference to FIG. 19. For example, when the owner of the portable telephone device 10 presses the POS button 17a long, an emergency signal with position data added thereto is sent to a monitoring center by the data communication function. At the monitoring center, the position data is displayed as a pointer 110 on a map image on a display unit. Thus, at the monitoring center, the position of the owner who is sending the emergency signal can be specified immediately.

Another example of use on the base station side will now be described. Since the base station can learn the position where a telephone call was made from the portable telephone device 10 or the portable telephone device 40, the base station can provide a service to describe the place where the telephone call was made, in an invoice.

In the portable telephone device 10 or 40, the POS button 17a as the user interface means is provided as a hardware button. However, it may be a programmable button for which the user can decide its meaning, a software button which differs in function depending on the status and mode, or a GUI-based button.

In the above description, the position information may be constantly calculated or may be calculated when the POS button 17a is pressed. However, the calculation and transmission may be started within a predetermined time after the POS button 17a is pressed. In any case, the power of the battery or the like can be saved.

Although the portable telephone devices are used in the embodiments, a similar POS button may be installed on a fixed telephone device or a stationary telephone device.

Moreover, the function of the POS button may be provided for the jog dial 17b shown in FIG. 14. For example, when the jog dial 17b is pressed for two to three seconds, the CPU may determine that the POS button is pressed.

In the telephone device according to the present invention, when the user decides to send position determination information by using the user interface means, the control means controls at least the position determination information sending means to send the position determination information to a desired communicating party via a base station.

Moreover, in the telephone device according to the present invention, when the user decides to determine the present position by using the user interface means, the control means controls at least the present position determination means to determine the present position. Therefore, since, for example, a button is provided as the user interface means, the user can carry out user interface operation more easily and can easily handles various applications. Furthermore, since the user can constantly decide the timing for sending position information at his/her will, the power can be saved and the communication cost can be saved at the same time.

What is claimed is:

1. A telephone device for sending and receiving at least an audio signal to and from a desired communicating party, the telephone device comprising:

present position determination means for determining a present position and acquiring position determination information, wherein the present position determination means acquires position determination information by averaging present position data and time data obtained by a Global Positioning System with present position data and time data obtained by a base station signal;

position determination information sending means for sending the position determination information acquired by the present position determination means by at least two communication means, the communication means being data communication means and local radio communication means, the data communication means enabling the telephone device to communicate with a first external device located within a first distance range, the local radio communication means enabling the telephone device to communicate with a second external device located within a second distance range, and the second distance range being smaller than the first distance range;

user interface means provided on the telephone device for allowing a user to send the position determination information using at least the position determination information sending means to the desired communicating party, wherein the position determination information is sent to the desired communicating party when the user interface means is activated by the user;

first control means for controlling at least the position determination information sending means on the basis of a decision by the user;

display means for displaying position determination information on a map of a map display function;

second control means for controlling enlargement/reduction of the map; and third control means for:
   determining whether the telephone device is in communication with the first external device when the user interface means is activated; and
   selecting the data communication means and transmitting the position determination information to the first external device via the data communication means if the third control means determines that the telephone device is in communication with the first external device, or selecting the local radio communication means and transmitting the position determination information to the second external device via the local radio communication means if the third control means determines that the telephone device is not in communication with the first external device.

2. The telephone device as claimed in claim 1, wherein the first control means causes the position determination information sending means to send the position determination information only when transmission of the position determination information is decided by the user interface means.

3. The telephone device as claimed in claim 1, wherein the user interface means allows the user to also decide position determination of the present position using the present position determination means.

4. The telephone device as claimed in claim 3, wherein the first control means causes the present position determination means to determine the present position only when position determination of the present position is decided by the user by activating the user interface means.

5. The telephone device as claimed in claim 1, wherein the present position determination means constantly determines the present position and thus acquires the position determination information.

6. The telephone device as claimed in claim 5, wherein in accordance with a decision operation by the user using the user interface means, the position determination information sending means is caused to send the position determination information acquired by the present position determination means.

7. The telephone device as claimed in claim 1, wherein the user interface means is a button.

8. The telephone device as claimed in claim 1, wherein the telephone device is a portable telephone device.

9. A telephone device capable of sending and receiving at least an audio signal to and from a desired communicating party, and connecting to a network and transmitting a text, audio and/or video information to and from an information provider side and/or another terminal device, the telephone device comprising:
   present position determination means for determining a present position and acquiring position determination information;
   present position determination information sending means for sending the present position determination information acquired by the present position determination means by at least two communication means, the communication means being data communication means and local radio communication means, the data communication means enabling the telephone device to communicate with a first external device located within a first distance range, the local radio communication means enabling the telephone device to communicate with a second external device located within a second distance range, and the second distance range being smaller than the first distance range;
   user interface means provided on the telephone device for allowing a user to send the present position information using at least the present position determination information sending means to the desired communicating party, wherein the position determination information is acquired and sent to the desired communicating party when the user interface means is activated by the user;
   first control means for controlling at least the present position determination means on the basis of a decision by the user;
   display means for displaying position determination information on a map of a map display function;
   second control means for controlling enlargement/reduction of the map; and
   third control means for:
      determining whether the telephone device is in communication with the first external device when the user interface means is activated; and
      selecting the data communication means and transmitting the position determination information to the first external device via the data communication means if the third control means determines that the telephone device is in communication with the first external device, or selecting the local radio communication means and transmitting the position determination information to the second external device via the local radio communication means if the third control means determines that the telephone device is not in communication with the first external device.

10. The telephone device as claimed in claim 9, wherein the first control means causes search of information on the information provider side connected to the network on the basis of the position determination information acquired by the present position determination means in accordance with the decision by the user by activating the user interface means.

11. The telephone device as claimed in claim 10, wherein if the user interface means is operated during search of information for which an area or a place is to be selected, from the information provider side connected to the network, the first control means causes selection of information of the area or place corresponding to the present position.

12. The telephone device as claimed in claim 9, wherein the first control means causes sending of the position determination information of the telephone device itself to the another terminal device connected to the network on the basis of the decision by the user activating the user interface means.

13. The telephone device as claimed in claim 12, wherein when the another terminal device includes a map display function, the position determination information of the telephone device itself is displayed on the map by the map display function.

14. The telephone device as claimed in claim 13, wherein the position determination information sending means is caused to send the position determination information handled as an emergency signal in the another terminal device, on the basis of the decision by the user activating the user interface means.

15. The telephone device as claimed in claim 9, wherein when the user interface means is operated, the first control means causes the position determination information sending means to send the position determination information of the telephone device itself to the another terminal device existing in a surrounding area by using the local radio communication means.

16. A telephone device for sending and receiving at least a signal to and from a desired communicating party, the telephone device comprising:

a position determination unit for acquiring position information and determining a present position of the telephone device based on the acquired position information, wherein the position determination unit acquires position determination information by averaging position data and time data obtained by a Global Positioning System with position data and time data obtained by a base station signal;

a position information sending unit for sending the position information to the desired communicating party by at least two communication units, the communication units being a data communication unit and a local radio communication unit, wherein the data communication unit enables the telephone device to communicate with a first external device located within a first distance range from the telephone device, and wherein the local radio communication unit enables the telephone device to communicate with a second external device located within a second distance range from the telephone device, the second distance range being smaller than the first distance range;

a user interface unit provided on the telephone device for allowing a user to send the position information using at least the position information sending unit to the desired communicating party, wherein the position information is sent to the desired communicating party when the user interface unit is activated by the user;

a display unit for displaying position determination information on a map of a map display function; and a control unit for controlling sending the position information based on a communication status of the telephone device, wherein the control unit:
  determines whether the telephone device is in communication with the first external device when the user interface unit is activated; and
  transmits the position information to the first external device via the data communication unit if the telephone device is in communication with the first external device, or transmits the position information to the second external device via the local radio communication unit if the telephone device is not in communication with the first external device.

\* \* \* \* \*